Patented July 1, 1930

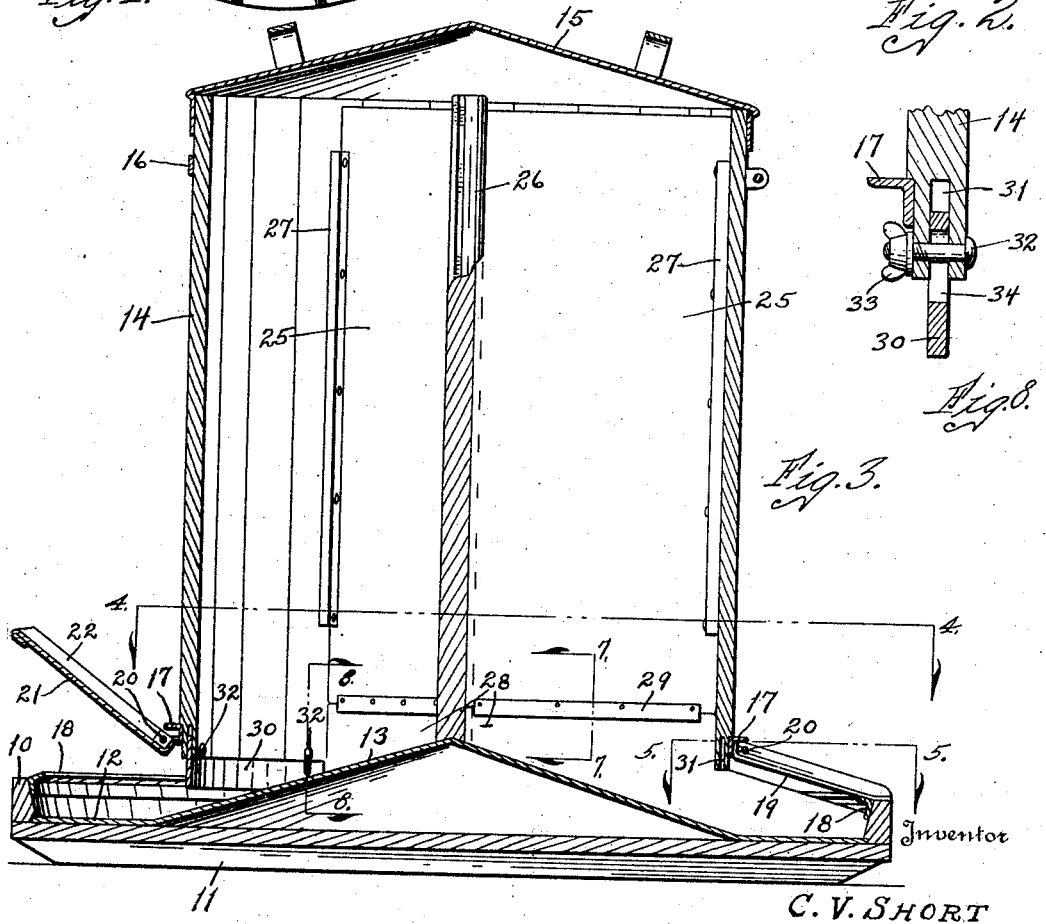

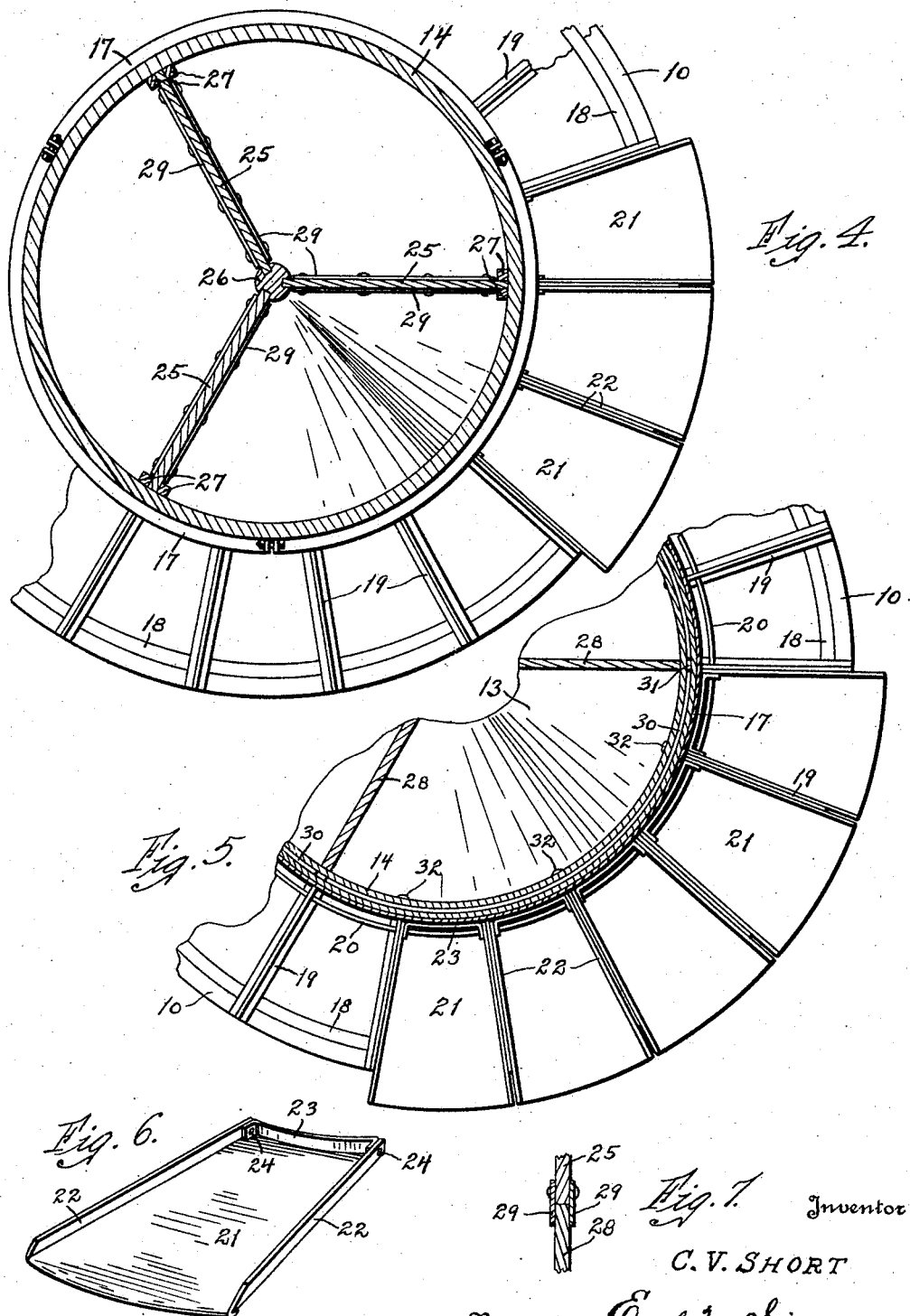

1,769,042

UNITED STATES PATENT OFFICE

CHARLES V. SHORT, OF DES MOINES, IOWA

HOG FEEDER

Application filed July 29, 1927. Serial No. 209,243.

The object of this invention is to provide an improved construction for a feeder for hogs and the like, which feeder is capable of providing feed for a maximum number of animals for the space occupied and which also is sanitary because it can be readily and thoroughly cleaned.

A further object of the invention is to provide a hog feeder including a trough and a feed receptacle mounted thereon and capable of being readily removed for the purpose of cleaning the trough.

A further object is to provide an improved supporting spider for holding the feed receptacle above the trough and also to provide separate feeding spaces about the trough and means for supporting individual hinged lids for the several feeding spaces.

A further object of the invention is to provide a feeding device of circular form, so arranged that a maximum number of animals may feed at one and the same time and occupy spaces entirely surrounding the device.

Another object of the invention is to provide an improved construction for a feed receptacle for the device, together with means for dividing said receptacle into a plurality of compartments for different kinds of feed.

Still another object is to provide improved adjustable throat boards to regulate the flow of feed to the feeding spaces.

With these and other objects in view, my invention consists in the construction, arrangement and combination of elements hereinafter set forth, pointed out in the claims and indicated by the accompanying drawings in which:

Fig. 1 is a plan view of a feeding device constructed in accordance with my invention.

Fig. 2 is a side elevation of the same.

Fig. 3 is a vertical section on an enlarged scale on the line 3—3 of Fig. 1.

Fig. 4 is a horizontal section of a portion of the device on the line 4—4 of Fig. 3.

Fig. 5 is a detail horizontal section on the line 5—5 of Fig. 3.

Fig. 6 is a perspective view of one of the lids detached from the feeder.

Fig. 7 is a detail vertical section on the line 7—7 of Fig. 3 showing how certain partition members are arranged to interlock.

Fig. 8 is a detail vertical section illustrating the method of adjustably mounting the throat boards to the receptacle wall.

In the construction of the device as shown, I employ a circular feeding trough 10, which preferably is mounted on skids 11. The trough 10 is provided with a sheet metal liner 12 for its bottom, which liner is shaped upwardly in its central portion to form a conical portion 13.

A feed receptacle is designated generally by the numeral 14 and said receptacle is of cylindrical form and is arranged to be mounted above the trough 10 and to supply feed thereto. The receptacle 14 is provided with a suitable removable cover 15. The receptacle 14 may be formed of vertically arranged wooden boards bound together at their upper ends by a metallic band 16 and at their lower ends by a metallic band 17, the latter band preferably being angular in cross section, as shown. The bands 16 and 17 preferably are formed each in several sections suitably bolted together.

A supporting spider is formed of metal and includes a ring 18 adapted to engage the upper part of the wall of the trough 10 and be supported thereby in such manner as to prevent lateral movement of the spider and members carried thereby. This may be accomplished by causing a portion of the ring 18 to engage within the trough, as shown in Fig. 3. The spider also includes a plurality of radial bars 19 fixed to the ring 18 and inclining upwardly to the lower margin of the wall of the feed receptacle 14 immediately below and fixed to the band 17. In this manner, the spider provides a means for supporting the feed receptacle 14 slightly above and in a central location relative to the trough 10, it being understood that the trough is of larger diameter than the receptacle, to provide an annular feeding space, which space is divided into individual feeding spaces by the bars 19 of the spider. The bars 19 preferably are of inverted T-shape in cross section and overlap at their outer ends the wall of the trough 10, as clearly shown in Figs. 4 and 5. The inner ends of the bars 19 are bound together by a circular rod 20, which extends through apertures near the inner ends of the bars and is thus spaced a slight distance outside of the wall of the receptacle 14. Each of the feeding spaces between adjacent spider bars 19 is provided with a separate sheet metal lid 21. Each lid 21 is formed of a piece of heavy sheet metal and is wider at its outer than at its inner end to conform to the feeding space beween adjacent bars 19 and to fit rather snugly between the upturned flanges of said bars and to rest upon the horizontal flanges thereof. The lids 21 are turned upwardly at their side margins to form flanges 22 and also may be provided with upturned flanges 23 at their inner ends. The inner ends of the side flanges 22 of the lids are apertured at 24 to receive the rod 20, which rod constitutes a hinging means for all of the lids. The lids 21 extend a suitable distance beyond the spider and beyond the wall of the trough 10, so that they may be raised by the animals seeking to feed from the trough and when the animal is through and removes his head from the trough, the lids will fall by gravity to their normal positions. The inner upper ends of the lids 21 are overlayed by the horizontal flange of the band 17, which tends to prevent water from running down the side wall of the receptacle and entering the trough and said lids also fit snugly between the bars 19 to prevent water from entering there. Any small quantity of water which may enter between the lids and the bars will run down the horizontal flanges of the T-shaped bars and be discharged outside of the trough.

It is some times desirable to provide a plurality of compartments within the receptacle 14, so that several different kinds of feed may be used. In this instance, I have shown three substantially radial partitions, which are indicated by the numerals 25. The inner ends of the partitions 25 may engage a central post 26 and the outer margins of said partitions may engage between vertical cleats 27 carried by the wall of the receptacle. The partitions 25 may be removed by upward sliding movement when desired. The removable partitions 25 extend nearly to the bottom of the receptacle 14 where they rest upon permanent partition members 28, which rest upon the conical deflector 13 and may extend out to the wall of the trough 10. The lower margins of the removable partitions 25 preferably have cleats 29 fixed on opposite sides thereof to engage loosely the upper margins of the permanent partitions 28, as shown in detail in Fig. 7.

Dry feed from the receptacle 14 is caused to flow downwardly over the conical deflecting portion 13 of the liner, beneath the lower margin of the wall of the receptacle to the feeding spaces of the trough, where the animals have access to it by raising any one of the hinged lids 21. It is sometimes desirable to adjust the width of the space between the conical deflector 13 and the lower margin of the wall of the receptacle and for this purpose, I have provided vertically adjustable throat boards or plates 30. A number of the throat boards 30 are provided and together, they encompass the circumference of the receptacle 14 and vertically adjustable on the lower end of the wall thereof. I have shown the lower end of the wall of the receptacle 14 formed with a downwardly opening slot or notch 31, to receive the throat boards 30, which boards are slotted at 34 to receive bolts 32 extending through the notch portion of the wall of the receptacle. The bolts 32 are provided with wing nuts 33 on their outer ends adapted to be tightened to clamp the notch portions of the wall upon the throat boards 30 and hold them in their selected positions of adjustment.

The circular form of the feed receptacle and trough facilitates the feeding of a maximum number of animals, as they may occupy, while feeding, the space entirely surrounding the trough. This construction also provides for a maximum capacity of the feed receptacle for the space occupied.

When it is desired to clean the trough, which should be done at frequent intervals for sanitary purposes, it is only necessary to remove the feed receptacle 14 therefrom by lifting it or tipping it, in which operation the spider comes away from the trough with the receptacle. This leaves the trough entirely free and open, so that it may be cleaned out and thoroughly washed after which the feed receptacle and supporting spider are replaced on the trough.

I claim as my invention:

1. A hog feeder comprising a substantially circular trough, a substantially cylindrical feed receptacle of less diameter than said trough, a spider having an outer rim portion and having some of its parts adapted to rest loosely on the wall of said trough and also having radial arms extending inwardly and upwardly from said rim portion and engaging the lower part of the wall of said receptacle, the rim of said spider having portions extending within and adapted to engage the wall of the trough to normally prevent lateral movement of the spider and parts carried thereby, and separate hinged lids mounted between each pair of adjacent arms of the spider.

2. A hog feeder comprising a substantially circular trough, a substantially cylindrical feed receptacle of less diameter than said trough, a spider having a rim portion adapted to rest loosely against the wall of said trough and also having radial arms extending inwardly and upwardly from said rim portion and engaging the lower part of the wall of said receptacle, said arms being of inverted T-shape in cross section, and separate hinged lids mounted between each pair of adjacent arms of the spider, said lids adapted normally to rest on the horizontal flanges of said arms, with the vertical flanges thereof projecting between adjacent lids.

3. A hog feeder comprising a substantially circular trough, a substantially cylindrical feed receptacle of less diameter than said trough and arranged to be mounted concentrically thereof, a spider including a rim portion adapted to rest loosely against the upper inner marginal portion of the wall of said trough and also including radial arms extending inwardly and upwardly from said rim portion and engaging the lower part of the wall of said receptacle, said arms also being extended outwardly beyond said rim portion to overlie the wall of the trough, an annular hinge rod arranged near the junction of said arms with the wall of the receptacle, and a plurality of lids hinged on said rod and normally covering the spaces between adjacent arms of the spider, said lids also extending beyond the wall of the trough.

4. In a hog feeder, a trough, a feed receptacle having its wall spaced inwardly from the wall of said trough and its lower margin spaced above the bottom of the trough, the lower portion of the wall of said receptacle being formed with a downwardly opening notch, a throat board arranged for vertical adjustment in said notch, whereby portions of said wall contact with opposite sides of said throat board, and a means for clamping the notched wall portion of the receptacle upon said throat board to maintain it in adjusted position, the upper margin of said throat board being enclosed by the notched portion of the wall whereby to prevent lodgement of substances between said members.

5. A hog feeder comprising a circular trough, a substantially cylindrical feed receptacle mounted above and concentrically of said trough whereby an annular feeding space is provided entirely around said trough, fixed partitions mounted on the bottom of said trough, the wall of said receptacle being provided with vertical slide bearings on its inner face, and removable partitions slidably engaging the slide bearings in said feed receptacle and cooperating with the fixed partitions for dividing the feeder into a plurality of compartments.

CHARLES V. SHORT.